US012509335B2

(12) United States Patent
Borofka et al.

(10) Patent No.: US 12,509,335 B2
(45) **Date of Patent: *Dec. 30, 2025**

(54) MOBILITY BASE

(71) Applicant: Oshkosh Corporation, Oshkosh, WI (US)

(72) Inventors: Janine Borofka, Oshkosh, WI (US); Peter Tan, Oshkosh, WI (US); Gregory S. Brulo, Oshkosh, WI (US); Jihong Hao, Greencastle, PA (US); Prabhu Shankar, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/367,289

(22) Filed: Sep. 12, 2023

(65) Prior Publication Data

US 2023/0416062 A1 Dec. 28, 2023

Related U.S. Application Data

(63) Continuation of application No. 17/193,061, filed on Mar. 5, 2021, now Pat. No. 11,787,674.

(Continued)

(51) Int. Cl.
*B66F 7/06* (2006.01)
*B66F 7/28* (2006.01)

(52) U.S. Cl.
CPC .......... *B66F 7/0633* (2013.01); *B66F 7/0625* (2013.01); *B66F 7/28* (2013.01)

(58) Field of Classification Search
CPC .......... B66F 9/18; B66F 9/06; B66F 9/07504; B66F 9/08; B66F 9/087; B66F 9/063; B66F 9/0655; B66F 7/0633; B66F 7/0625; B66F 7/28; B66F 11/044; B66F 11/046; B66F 11/048; B66F 3/28; B66F 3/36;

(Continued)

(56) References Cited

U.S. PATENT DOCUMENTS 3,280,676 A 10/1966 Grzymislanwski
5,200,674 A 4/1993 Fujimoto et al.

(Continued)

OTHER PUBLICATIONS

Fowit, "Self-Propelled Stock Picker, Operator Manual," URL: https://content.toolots.com/media/attachment/file/F/O/FOWIT%20Self-propelled%20stock%20picker%20manual-updated%20190705.pdf, Retrieved Jun. 7, 2021, 41 pages.

*Primary Examiner* — Brian D Keller
*Assistant Examiner* — Alberto Saenz
(74) *Attorney, Agent, or Firm* — FOLEY & LARDNER LLP

(57) ABSTRACT

A lift device includes a base, a retractable lift assembly, a coupler, an electro-mechanical device, and a battery pack. The base includes an electric drive and at least two rotatable wheels powered by the electric drive. The retractable lift assembly includes a first end coupled to the base and a second end that is movable relative to the base. The coupler is mounted to a first surface of the retractable lift assembly and includes at least one mounting stud, the at least one mounting stud extending outwardly away from the coupler. The electro-mechanical device is detachably coupled to the at least one mounting stud and is repositionable relative to the retractable lift assembly. The battery pack is electrically connected to the electric drive and the retractable lift assembly.

19 Claims, 7 Drawing Sheets

Related U.S. Application Data

(60) Provisional application No. 62/986,468, filed on Mar. 6, 2020.

(58) Field of Classification Search
CPC ...... B60R 9/06; B25J 5/00; B25J 5/007; B25J 5/02; B25J 5/04; B25J 5/06
USPC .................... 254/2 C, 9 C, 10 C, 131, 133 R
See application file for complete search history.

(56) References Cited

U.S. PATENT DOCUMENTS

| | | | | |
|---|---|---|---|---|
| 5,273,132 | A * | 12/1993 | Sasaki | B66F 11/04 187/244 |
| 5,419,673 | A * | 5/1995 | Merhar | E02F 3/3672 37/468 |
| 6,321,818 | B1 | 11/2001 | Ethington | |
| 6,962,210 | B1 | 11/2005 | Redenius | |
| 8,695,919 | B2 | 4/2014 | Shachor et al. | |
| 9,840,403 | B2 * | 12/2017 | Iotti | B66F 17/003 |
| 9,890,024 | B2 | 2/2018 | Hao et al. | |
| 9,964,398 | B2 | 5/2018 | Becker et al. | |
| 10,221,055 | B2 | 3/2019 | Hao et al. | |
| 10,407,288 | B2 | 9/2019 | Hao et al. | |
| 10,544,556 | B2 | 1/2020 | Amin et al. | |
| 10,858,230 | B2 | 12/2020 | Hackenberg et al. | |
| 10,858,231 | B2 | 12/2020 | Holmes et al. | |
| 10,934,145 | B2 | 3/2021 | Hao et al. | |
| 10,974,938 | B2 | 4/2021 | Fenner | |
| 11,014,796 | B2 | 5/2021 | Bafile et al. | |
| 2019/0126460 | A1 | 5/2019 | Mittelstadt et al. | |
| 2019/0144246 | A1 | 5/2019 | Kaytes | |
| 2019/0291955 | A1 | 9/2019 | Bastian | |
| 2019/0352157 | A1 | 11/2019 | Hao et al. | |
| 2020/0262688 | A1 | 8/2020 | Ryan | |
| 2020/0310399 | A1 * | 10/2020 | Qi | G01C 21/16 |
| 2020/0317256 | A1 | 10/2020 | Hao et al. | |
| 2020/0317480 | A1 | 10/2020 | Shankar et al. | |
| 2020/0317486 | A1 | 10/2020 | Puszkiewicz et al. | |
| 2020/0317488 | A1 | 10/2020 | Bafile et al. | |
| 2020/0399107 | A1 | 12/2020 | Buege et al. | |
| 2021/0039934 | A1 | 2/2021 | Hackenberg et al. | |
| 2021/0070595 | A1 | 3/2021 | Holmes et al. | |
| 2021/0155463 | A1 | 5/2021 | Hao et al. | |

* cited by examiner

MOBILITY BASE

CROSS REFERENCE TO RELATED APPLICATION

This application is a continuation of U.S. patent application Ser. No. 17/193,061, filed Mar. 5, 2021, which claims priority to U.S. Provisional Patent Application No. 62/986,468, filed Mar. 6, 2020, each of which are incorporated herein by reference in their entireties.

BACKGROUND

The present disclosure relates generally to lift equipment. More specifically, the present disclosure relates to lift equipment configured for material handling.

Lift devices, such as vertical lifts, telehandlers, and scissor lifts, are used to lift and transport materials in a variety of different fields (e.g., construction, farming, manufacturing, warehouse storage, etc.). Lift devices raise and lower materials relative to the ground. Some lift devices include wheels to permit transportation of the materials over extended distances. However, these lift devices are typically large, heavy, and have limited range of movement.

SUMMARY

One exemplary embodiment relates to a lift device. The lift device includes a base, a retractable lift assembly, and a coupler. The base includes at least two wheels. The retractable lift assembly includes a first end coupled to the base and a second end that is movable relative to the base. The coupler is attached to the retractable lift assembly a distance from the first end. The coupler is configured to detachably couple the retractable lift assembly to an electro-mechanical device. The coupler includes a first flange coupled to a first side of the retractable lift assembly and a second flange coupled to a second side of the retractable lift assembly opposite the first side. The coupler additionally includes a pair of diametrically opposed mounting studs. A first stud of the pair of mounting studs extends outwardly from the first flange normal to the first side. A second stud of the pair of mounting studs extends outwardly from the second flange normal to the second side. The coupler further includes a pin extending through at least one of the first flange or the second flange below the pair of mounting studs.

Another exemplary embodiment relates to a lift device. The lift device includes a base, a retractable lift assembly, an electro-mechanical device, and a battery pack. The base includes an electric drive and at least two rotatable wheels powered by the electric drive. The retractable lift assembly includes a first end coupled to the base and a second end that is movable relative to the base. The electro-mechanical device is detachably coupled to the retractable lift assembly and is repositionable relative to the retractable lift assembly. The battery pack is electrically connected to the electric drive and the retractable lift assembly.

Another exemplary embodiment relates to a material handling system. The material handling system includes a lift device and a coupler assembly. The lift device includes at least two rotatable wheels, a base, and a retractable lift assembly that has a first lift end coupled to the base and a second lift end that is movable relative to the base. The coupler assembly includes a first flange, a second flange, and a pair of diametrically opposed mounting stud ends. The first flange includes a first surface and a first aperture. The second flange includes a second surface and a second aperture. The pair of diametrically opposed mounting stud ends include a first stud end that extends from the first flange in a direction perpendicular to the first surface and a second stud end that extends from the second flange in a direction perpendicular to the second surface. The coupler is mounted to the retractable lift assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
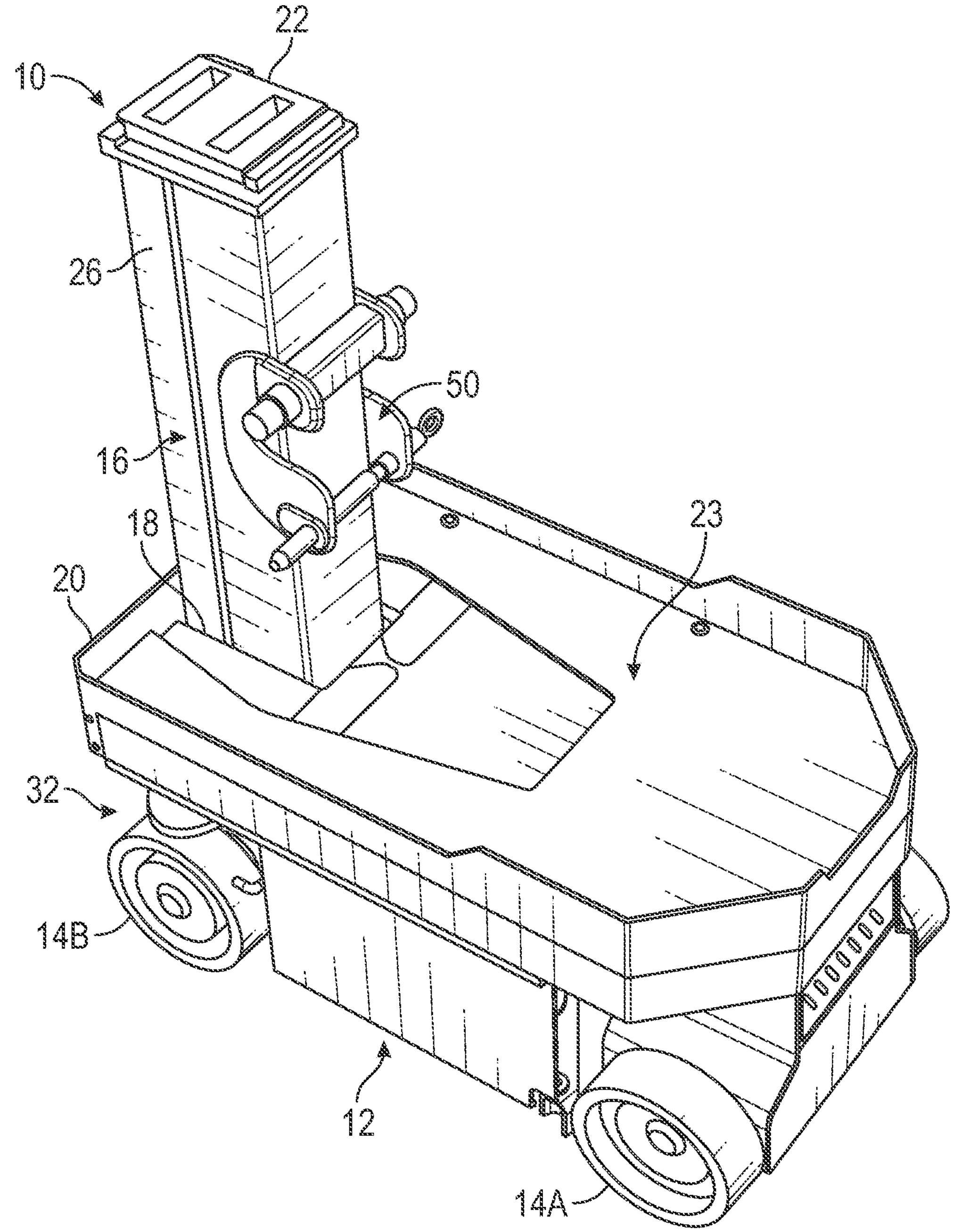
FIG. 1 is a perspective view of a lift device, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a lift device is shown according to various exemplary embodiments. The lift device is a self-propelled elevatable mobile platform (EMP) configured to reposition and/or operate on various materials. In particular, the lift device is configured as a human lift assist device that facilitates users with repetitive and/or tedious material lifting and/or placement operations. The lift device includes a base including a driver and at least two rotatable wheels powered by the driver. According to an exemplary embodiment, the base is self-powered by a clean, quiet lithium-ion battery pack. The base may be sized to operate in areas with limited space (e.g., between shelves, between assembly lines, etc.). As such, the lift device may be operated indoors, and in many instances, alongside an operator moving between various work areas.

The lift device also includes a repositionable mast (e.g., a telescopic mechanism, a compliant mechanism, etc.) and a universal coupler mounted to the repositionable mast. The universal coupler is adapted (e.g., configured, structured, etc.) to detachably (e.g., removably, etc.) couple the lift device to an electro-mechanical device and/or subsystem, such as a robotic arm, or another materials manipulation and/or processing apparatus. In other words, the coupler is configured such that various different electro-mechanical devices may be interchangeably coupled to the repositionable mast. The coupler and mast are arranged such that external loads, applied to the electro-mechanical device by the materials, are positioned close to a center of gravity of the lift device. This arrangement improves stability of the lift device during operation (e.g., when manipulating the electro-mechanical device and/or materials being operated on (e.g., lifted, etc.) by the electro-mechanical device).

In some embodiments, the lift device is equipped with a stability and/or load system (e.g., a lift device controller) that controls operation of the lift device and determines a range of operating parameters for the lift device. The range of operating parameters may be determined, in part, by measuring (or estimating) a load supported by the repositionable mast. For example, the load may be measured using one, or a plurality of sensors positioned within the mast or on a surface of the mast (e.g., strain sensors) to determine the stress applied to the mast and the resulting bending moment due to an overhung load (e.g., based on the material and/or geometry of the mast, etc.). In some embodiments, the range of operating parameters may also be determined based on a position of the load with respect to the base and/or mast (e.g., an amount of extension of the electro-mechanical device, an amount of extension of the mast, etc.). For example, the stability and/or load system may be configured to calculate a center of gravity of the load based on a measured displacement of the electro-mechanical device and/or mast. The stability and/or load system may be configured to use one, or a combination of the (i) stress on the mast, (ii) measured load, and (iii) the position of the load (e.g., the center of gravity of the load) to determine a maximum extension of the electro-mechanical device (e.g., robotic arm, linear actuator, etc.) in a lateral direction perpendicular to a central axis of the mast, or a maximum extension of the mast away from the base. Additionally, the stability and/or load system may be configured to use this information to determine an outrigger position and/or required counterweight to perform a desired operation (e.g., to enlarge the range of operating parameters). Among other benefits, the stability and/or load system simplifies the operation of the lift device and improves the safety of the lift device, for example, by preventing a user from overloading the lift device, as will be further described.

As utilized herein, the term "electro-mechanical device" refers to a component or combination of components that are configured to connect to, manipulate a position of, and/or operate on materials. In one embodiment, the electro-mechanical device may be configured to mechanically engage with the material to facilitate transport operations. For example, in a commercial warehouse facility, an electro-mechanical device may be robotic arm with a grasping device (e.g., pinchers, forks, suction cups, etc.) that is configured to grab packages. In other embodiments, the electro-mechanical device may be another type of collaborative robotics device. In yet other embodiments, the electro-mechanical device may be configured to perform other operations on the materials, such as cutting, welding, compacting, etc. These operations typically require different equipment, or "effectors" that directly engage with the materials. For example, returning to the transport operations scenario above, the grasping device may serve as the effector of the electro-mechanical device, whereas in a welding operation, a welding tool with a dispensable electrode may serve as the effector of the electro-mechanical device. In some embodiments, the electro-mechanical device includes only an effector without a separate extendible arm or positioning device. In other embodiments, the electro-mechanical device includes additionally component to facilitate movement of the effector (e.g., a robotic arm, a linear actuator, a motor, etc.).

Figure 2:
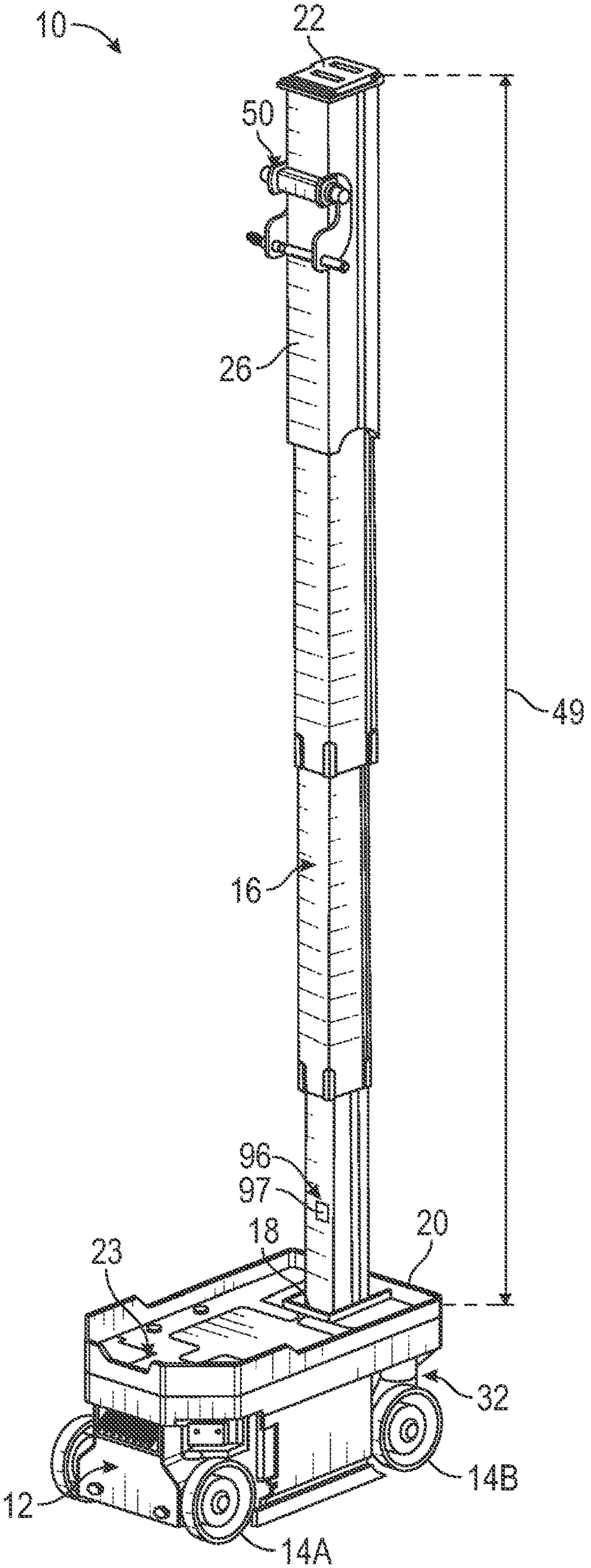
FIG. 2 is a perspective view of the lift device of FIG. 1 with a retractable lift assembly in an extended position, according to an exemplary embodiment.
Figure 3:
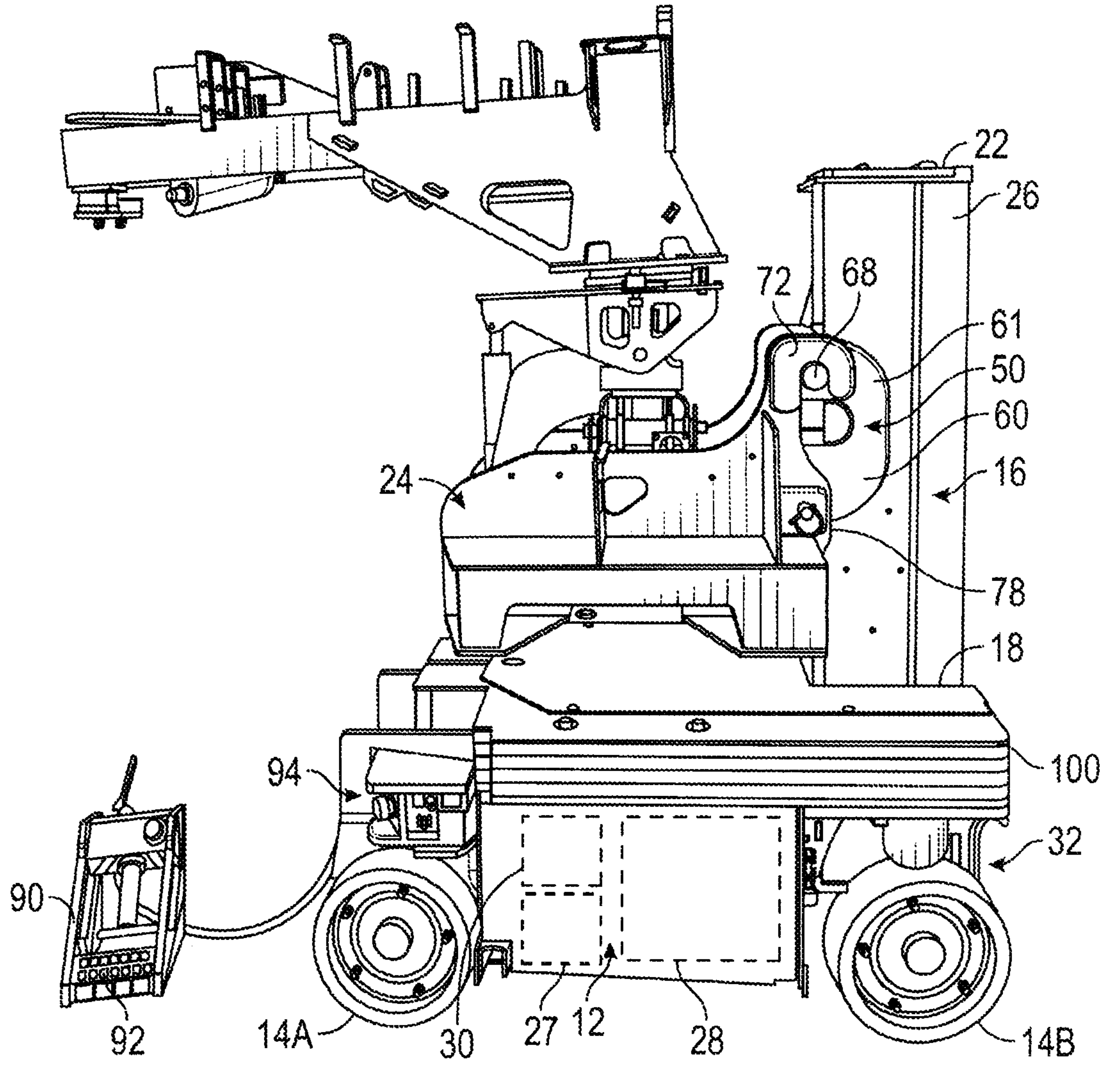
FIG. 3 is a side view of the lift device of FIG. 1 and an electro-mechanical device that is connected to the lift device, according to an exemplary embodiment.

In one exemplary embodiment, and as depicted in FIGS. 1-3, a lift device is shown as EMP 10. In some embodiments, the EMP 10 is a fully-electric self-propelled vertical lift (e.g., a mast lift, etc.). In other embodiments, the EMP 10 is incorporated as part of a telehandler, a scissor lift, or another form of portable and/or standalone lift. The EMP 10 may be used to facilitate material transport and/or processing operations in the construction, robotic, manufacturing, and warehouse industries. For example, the EMP 10 may be used in a warehouse environment to facilitate lifting and/or transport of consumer goods (e.g., packages, etc.) between shelves for storage and/or shipping operations. Similarly, in the manufacturing industry, the EMP 10 may be used to supply raw materials to the production line from storage areas. In the construction industry, the EMP 10 may be used for picking and placement of raw materials such as masonry (e.g., brick, stone, etc.), lumber, roofing materials, and the like. The EMP 10 may be used to directly place the raw materials to their final location, rather than in temporary holding areas, to minimize the amount of manual placement by laborers and keep them (comfortably) on the job longer.

As shown in FIGS. 1-2, the EMP 10 includes a base 12 supported by wheels 14A, 14B positioned about the base 12 (e.g., coupled to a frame of the base 12 and extending beneath the frame, supporting the base 12 above the ground, etc.). The EMP 10 also includes a retractable lift assembly, shown as mast 16. A first end 18 (e.g., proximal end, lower end, etc.) of the mast 16 is coupled to the base 12 adjacent to a side 20 of the base 12 along an outer perimeter of the base 12, while a second end 22 of the mast 16 is movable relative to the base 12 (e.g., extendible away from the base 12, etc.). The EMP 10 also includes an electro-mechanical device 24 detachably coupled to the mast 16 a distance from the first end 18, at an intermediate position between the first end 18 and the second end 22. In some embodiments, as shown in FIGS. 1-2, the EMP 10 further includes a storage tray 23 coupled to an upper surface of the base 12 beneath the electro-mechanical device 24.

As shown in FIG. 3, a battery pack, shown as battery 28 can be positioned on board the base 12 of the EMP 10 to supply electrical power to various operating systems present on the EMP 10. The battery 28 can be a rechargeable lithium-ion battery, for example, which is capable of supplying a direct current (DC) or alternating current (AC) to EMP 10 controls, motors, actuators, and the like. The battery 28 can include at least one input capable of receiving electrical current to recharge the battery 28. In some embodiments, the input is a port capable of receiving a plug (not shown) in electrical communication with an external power source, like a wall outlet. The battery 28 can be configured to receive and store electrical current from one of a traditional 120 V outlet, a 240 V outlet, a 480 V outlet, an electrical power generator, or another suitable electrical power source. The battery 28 may also include at least one output capable of supplying electrical power to charge various auxiliary devices, such as a powered hand-tool, work light, handheld radio or telephone, or other accessory that may be useful in a warehousing, construction, or other work environment. According to an exemplary embodiment, the battery 28 is a lithium-ion battery pack that can be fully recharged in 3 hours or less.

In some embodiments, the battery 28 is in communication with a lift device controller 30, which may command the battery 28 to selectively supply electrical power to the actuator to control the height and/or position of the electro-mechanical device 24 and the mast 16 or, similarly, to supply electrical power to a motor 27 to drive the EMP 10. According to an exemplary embodiment, the motor 27 is an electric drive. For example, the motor 27 can be an AC motor (e.g., synchronous, asynchronous, etc.) or a DC motor (shunt, permanent magnet, series, etc.) for example, which receives electrical power from the battery 28 or other electricity source on board the EMP 10 and converts the electrical power into rotational energy in a drive shaft (not shown). The drive shaft can be used to drive the wheels 14A, 14B of the EMP 10 using a transmission (not shown). The transmission can receive torque from the drive shaft and subsequently transmit the received torque to at least one of a rear axle or a forward axle of the EMP 10. In the exemplary embodiment of FIGS. 1-3, rotating the rear axle also rotates the rear wheels 14A on the EMP 10, which propels the EMP 10. Among other benefits, the electric drive can provide reduced noise, greater efficiency, and reduce maintenance requirements relative to other drive types (e.g., internal combustion engine, etc.).

According to an exemplary embodiment, the actuation system of the EMP 10 (e.g., steering system and mast retracting/deployment system, etc.) is electro-hydraulic (e.g., a combination of electric motors/actuators and hydraulic actuators). In other embodiments, the actuation system of the EMP 10 is all electric or all hydraulic. In other embodiments, the actuation system of the EMP 10 includes at least one pneumatic actuator.

The rear wheels 14A of the EMP 10 can be used to drive the vehicle, while the front wheels 14B can be used to steer the EMP 10 (e.g., two wheel steer). In other embodiments, the EMP 10 may be fitted with omnidirectional wheels to enhance maneuverability of the EMP 10 (e.g., to allow the EMP 10 to rotate 360° about a central axis of the base 12, to translate laterally, both side-to-side and front-to-back, etc.). In yet other embodiments, both the rear wheels 14A and the front wheels 14B can be used to steer the EMP 10 (e.g., four wheel steer), with or without omnidirectional wheels. In the exemplary embodiment of FIGS. 1-3, the rear wheels 14A are rigidly coupled to the rear axle of the base 12, and are held in a constant orientation (e.g., approximately aligned with an outer perimeter) relative to the base 12 of the EMP 10. In contrast, the front wheels 14B are pivotally coupled to the base 12 of the EMP 10 and can be rotated relative to the base 12 to adjust a direction of travel for the EMP 10.

Figure 4:
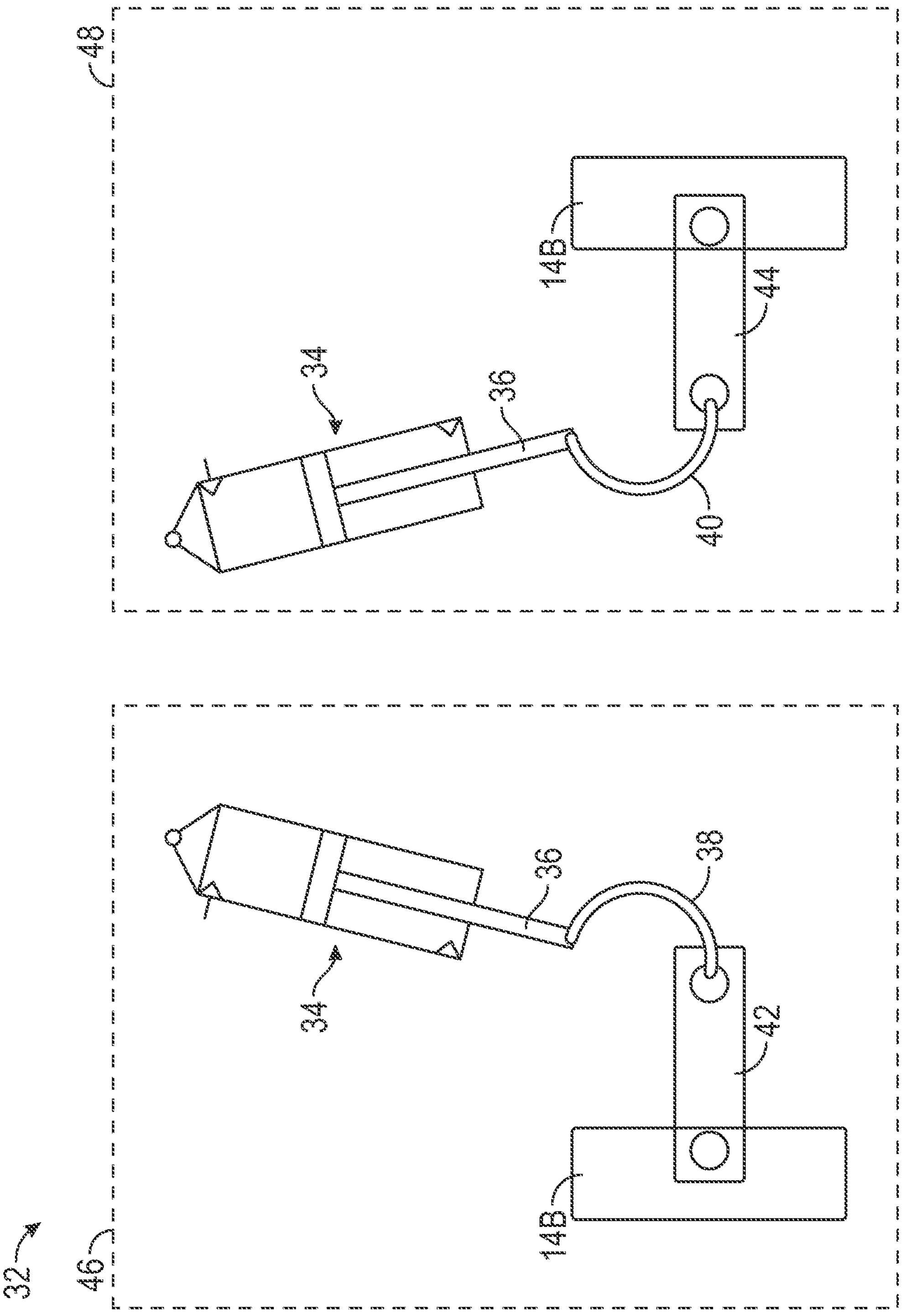
FIG. 4 is a schematic illustration of a steering system of a lift device, according to an exemplary embodiment.

The front wheels 14B can be oriented using a steering system 32, as depicted in additional detail in FIG. 4. The steering system 32 may be one of (i) a hydraulic dual-cylinder system, (ii) an electric actuator system, or (iii) a dual electric actuator system. In other embodiments, the steering system 32 may be another type of actuator system. In some embodiments, the steering system 32 includes a drag link (not shown) that is mechanically coupled to wheel hubs (e.g., knuckles, etc.) for each of the front wheels 14B. The drag link may be slidably engaged with the frame of the EMP 10 and moveable relative to the frame to control a position of both the front wheels 14B at the same time. The actuator may be coupled to the drag link, for example, to steer the EMP 10.

In the exemplary embodiment of FIG. 4, the steering system 32 is a dual electric actuator system. The steering system 32 may be mounted to an underside of the base 12 of the EMP 10, for example, and mechanically coupled to each of the two front wheels 14B (e.g., using fasteners). In some embodiments, the steering system 32 is completely contained within the outer perimeter of the base 12 of the EMP 10. As explained in additional detail below, each one of two linear actuators 34 can be moved to various different positions to orient the front wheels 14B of the EMP 10 in a desired direction of EMP 10 travel.

As shown in FIG. 4, the steering system 32 includes a pair of linear actuators 34. The linear actuators 34 each include an axially-movable piston 36. A distal end of each of the pistons 36 is pivotally coupled to a corresponding tie rod 38, 40. In the exemplary embodiment of FIG. 4, the tie rods 38, 40 have an arcuate shape designed to handle tensile loading. For example, each tie rod 38, 40 may be defined by a rigid, arcing member extending angularly between about 135 and 215 degrees (e.g., 180 degrees). The arc can be defined by a constant radius or, alternatively, a variable radius. Similarly, the tie rods 38, 40 can be defined by a uniform thickness throughout, or can vary. For example, the thickness of the tie rods 38, 40 can increase as the distance away from each of the ends increases (e.g., a point of maximum material thickness occurs near the center of each tie rod 38, 40). In some embodiments, the tie rods 38, 40 have identical sizes.

As shown in FIG. 4, an opposite end of each tie rod 38, 40 may be pivotally coupled to a corresponding flange 42, 44. The flanges 42, 44 may be coupled to and configured to control the orientation of the front wheels 14B. As such, the steering system 32 effectively includes two independent steering subsystems 46, 48 that may be collectively used to control the orientation of the orientation of the front wheels 14B and the EMP 10, more broadly. Among other benefits, the independent nature of the steering subsystems 46, 48 allows for the linear actuators 34 to be mounted in differing orientations on the bottom of the EMP 10. Further, the independent nature of the steering subsystems 46, 48 may allow for a more flexible steering capability. Additionally, the pivotal connections between the linear actuators 34 and the tie rods 38, 40 in conjunction with the pivotal connections between the tie rods 38, 40 and the flanges 42, 44 may eliminate lateral forces exerted onto the piston 36. Further still, the direct mounting of the linear actuators 34 and the tie rods 38, 40 may allow for the linear actuators 34 to be run at a lower actuator speed. Additional details regarding various steering systems 32 and mechanisms for the EMP 10 may be found in U.S. Patent Application No. 62/830,167, the entire disclosure of which is hereby incorporated by reference herein.

Returning now to FIGS. 1-3, the mast 16 is a telescopic vertical mast (e.g., boom) formed from a series of nested support members 26. In other embodiments, the mast 16 may be replaced with a scissor lift mechanism formed of a series of linked, foldable support members, as will be further described with reference to FIG. 6. In the embodiment of FIGS. 1-3, the mast 16 extends away from the base in perpendicular orientation relative to an upper surface of the base 12. In other embodiments, the mast 16 may be oriented at an angle relative to the upper surface. As shown in FIGS. 1-2, the mast 16 is selectively movable between a retracted, or stowed position (FIG. 1) and a deployed, elevated, or work position (FIG. 2) using an actuator (not shown). In the exemplary embodiment provided in FIGS. 1-2, the actuator is a hydraulic actuator (e.g., a hydraulic cylinder). In other embodiments, the actuator may be an electric actuator or a pneumatic cylinder, for example. In yet other embodiments, the actuator includes a cable, chain, and/or belt driven pulley system. The actuator controls the orientation of the mast 16 by selectively applying force to the mast 16 (to an outermost support member 26 of the mast 16). When a sufficient force is applied to the mast 16 by the actuator, the mast 16 deploys (e.g., extends vertically upwards) from the stowed, rest position. Because the electro-mechanical device 24 (see FIG. 3) is coupled to the mast 16 (e.g., the outermost support member 26), the electro-mechanical device 24 is also raised away from the base 12 in response to the deployment of the mast 16. In the exemplary embodiment of FIG. 2, the mast 16 can position materials weighing upwards of 135 lbs. and greater a maximum distance 49 up to 12 ft. or more away from the base 12. In other embodiments, the maximum distance 49 at which materials can be raised off of the base 12 may be different.

Figure 5:
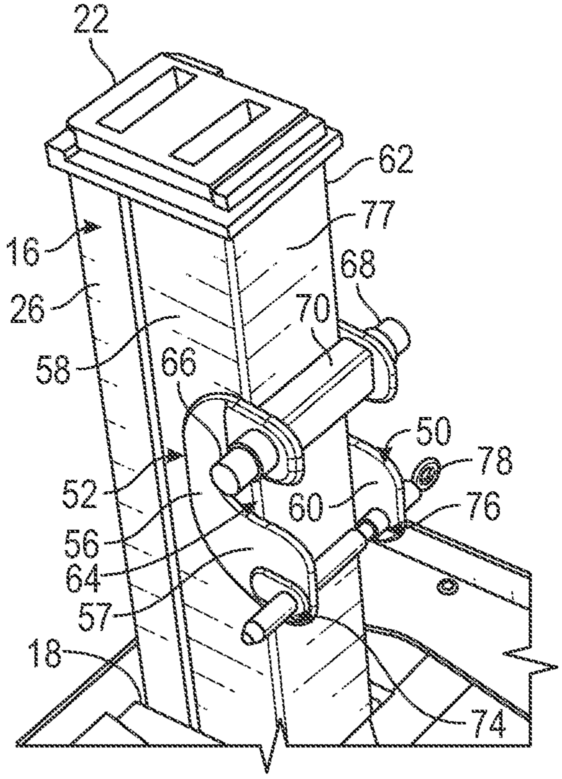
FIG. 5 is a reproduction of FIG. 1 near a coupler of the lift device, according to an exemplary embodiment.

The EMP 10 is structured to interchangeably couple with various different electro-mechanical devices 24. As shown in FIG. 5, the EMP 10 includes a universal coupler 50 (e.g., universal connector, adapter, interface, etc.) configured to detachably couple the electro-mechanical device 24 (see FIG. 3) to the mast 16. According to an exemplary embodiment, the universal coupler 50 is disposed at an intermediate position 52 along the mast 16 between opposing ends of the mast 16. In other embodiments, the universal coupler 50 may be positioned adjacent to the second end 22 of the mast or at another location along the mast 16. As shown in FIG. 5, the outermost support member 26 of the mast 16 is a rectangular prism that extends upwardly from the base 12. The universal coupler 50 includes a plurality of flanges including a first flange 56 coupled (e.g., welded, fastened, etc.) to a first side 58 of the outermost support member 26 (e.g., a first sidewall of the outermost support member 26) and a second flange 60 coupled to a second side 62 of the outermost support member 26 opposite the first side 58. The first flange 56 may further include an outer flange surface 57. Likewise, the second flange 60 may also include an outer flange surface 61. As shown in FIG. 5, the first flange 56 includes a slot 64 disposed at a central position along the first flange 56 forming a "C" shaped plate. An upper end and a lower end of the first flange 56 extend outwardly from the outermost support member 26 in a direction that is substantially perpendicular to a forward surface 77 of the outermost support member 26. In the exemplary embodiment of FIG. 5, the second flange 60 is a mirror image of the first flange 56. In other embodiments, the design of the first flange 56 and the second flange 60 may be different from each other.

According to an exemplary embodiment, the universal coupler 50 includes a pair of diametrically opposed mounting studs positioned on the upper end of the pair of flanges 56, 60. As shown in FIG. 5, a first stud 66 of the pair of mounting studs extends outwardly from an upper end of the first flange 56, in a direction normal to the first flange 56 (and first side 58). A second stud 68 of the pair of mounting studs extends outwardly from an upper end of the second flange 60, in a direction parallel to a central axis of the first stud 66 (e.g., normal to the second flange 60, normal to the second side 62, etc.). In some embodiments, the first stud 66 and the second stud 68 may be separately formed. In other embodiments, the first stud 66 and the second stud 68 may be integrally formed from a single piece of material (e.g., rod, cylinder, etc.) that extends between and through each of the pair of flanges 56, 60. In some embodiments, the second stud 68 may include a central axis that is coaxial with the central axis of the first stud 66. According to an exemplary embodiment, the universal coupler 50 also includes a support structure 70 (e.g., sleeve, etc.) that extends between the upper end of the pair of flanges 56, 60 and surrounds and supports the studs. As shown in FIG. 5, the support structure 70 may be coupled (e.g., welded, etc.) to the forward sidewall 77 of the outermost support member 26 to increase the maximum load that can be supported by the universal coupler 50.

In other embodiments, the universal coupler 50 may be coupled to the forward sidewall 77 of the outermost support member 26, and not to the first side 58 and second side 62 of the outermost support member 77. For example, the flanges 56, 60 may be coupled to the support structure 70, which is further coupled to the forward sidewall 77. In this configuration, the universal coupler 50 may extend outwardly in a direction normal to the forward sidewall 77. In yet other embodiments, the flanges 56, 60 may be respectively coupled to the first side 58 and second side 62 of the outermost support member 77 without extending outwardly in a direction substantially parallel to the first side 58 and second side 62. Put another way, the flanges 56, 60 and the corresponding studs 66, 68 may be positioned on the first side 58 and second side 60 such that neither the flanges 56, 60, nor the studs 66, 68 extend beyond the forward sidewall 77.

Among other benefits, the mounting studs provide a temporary support structure onto which the electro-mechanical device 24 may latch and/or hook when connecting the electro-mechanical device 24 to the universal coupler 50. As shown in FIG. 3, the mounting studs are structured to engage with a pair of hooks 72 of a support structure of the electro-mechanical device 24 (e.g., a support structure for a robotic arm, etc.). The hooks 72 may be rotatably coupled to the mounting studs. Furthermore, the hooks 72 may be "C" shaped, "U" shaped, "J" shaped, or some other shape. After engaging the hooks 72 with the studs 66, 68, and upon releasing the electro-mechanical device 24, the electro-mechanical device 24 rotates downwardly (e.g., counter-clockwise as shown in FIG. 3) about the studs 66, 68 under the force of gravity such that a lower end of the support structure contacts the outermost support member 26, namely the forward sidewall 77 of said outermost support member 26. In this way, the electro-mechanical device 24 is supported under its own weight by the universal coupler 50.

As shown in FIG. 5, a lower end of each flange 56, 60 defines a through-hole opening, shown as first opening 74 and second opening 76. The first opening 74 is axially aligned with the second opening 76 (e.g., coaxial, etc.). Each of the first opening 74 and the second opening 76 are sized to receive a pin 78 therein. As shown in FIG. 3, the pin 78 extends through corresponding openings in the support structure of the electro-mechanical device 24 to lock a rotational position of the electro-mechanical device 24 relative to the universal coupler 50 and to thereby prevent the electro-mechanical device 24 from becoming dislodged from the universal coupler 50 (e.g., to prevent the hooks 72 from disengaging the pair of mounting studs while operating the EMP 10). Furthermore, because the first stud 66 and second stud 68 preferably extend outwardly from the first flange 56 and second flange 60, respectively, the hooks 72 may be positioned outwardly from the first flange 56 and second flange 60 such that a spacing between the hooks 72 is greater than a spacing between the first flange 56 and the second flange 60. According to an exemplary embodiment, the hooks 72 may couple to the mounting studs at a coupling point that is proximate to the outer flange surfaces 57, 61. In such an arrangement, any lateral movement (i.e. movement in a direction parallel to the central axes of the studs 66, 68) of the electro-mechanical device 24 relative to the universal coupler 50 may be minimized as to prevent the decoupling of the electro-mechanical device from the studs 66, 68 during operation of the EMP 10.

Figure 6:
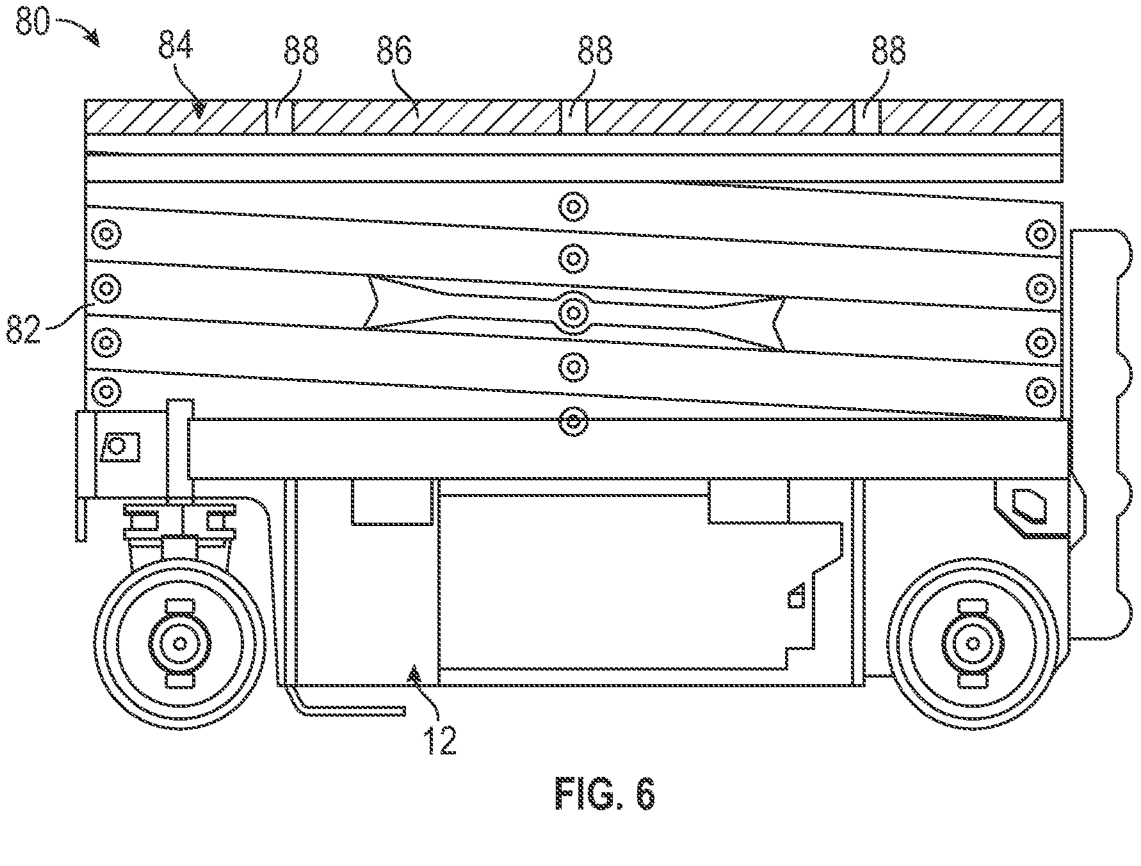
FIG. 6 is a side view of a lift device, according to another exemplary embodiment.

The design of the universal coupler 50 described with reference to FIGS. 3 and 5 should not be considered limiting. Various alternatives and combinations are possible without departing from the inventive principles described herein. For example, FIG. 6 shows an exemplary embodiment of an EMP 80 that includes a scissor lift mechanism 82 rather than a mast. The scissor lift mechanism 82 is disposed upon a base 12, which may be the same or similar to the base 12 described with reference to FIGS. 1-3. In some embodiments, the base 12 may be a modular structure that may be interchangeably connected to various different lift mechanisms, depending on the needs of the user. In the exemplary embodiment of FIG. 6, a universal coupler 84 of the EMP 10 is formed by a universal mounting plate, shown as mounting plate 86, that extends across and substantially covers an upper surface of the scissor lift mechanism 82. The mounting plate 86 defines a plurality of openings, shown as holes 88 that extend through at least a portion of the mounting plate 86. The electro-mechanical device 24 (e.g., a support structure of the electro-mechanical device 24 as shown in FIG. 3) may be detachably coupled to the mounting plate 86 via fasteners that engage with holes 88.

In other embodiments, another form of universal coupler or attachment interface may be used to detachably couple the electro-mechanical device 24 to the lift mechanism of the EMP 80 (e.g., to pair the EMP 80 with other electro-mechanical devices to form an advanced collaborative robotics device, etc.). For example, in one embodiment, a coupler support member having a rectangular or other cross-sectional shape may be coupled to and extend upwards (i.e. in the direction of the scissor lift extension) from the mounting plate 86. A universal coupler, such as the universal coupler 50 described above, may be mounted to a side of the coupler support member. The universal coupler may facilitate mounting of one of a variety of electro-mechanical devices, such as via hooks (e.g., the hooks 72 of the electro-mechanical device 24 described above) mounting to a pair of mounting studs (e.g., the mounting studs 66, 68 of the universal coupler 50 described above). In such an arrangement, the coupling of an electro-mechanical device to the universal coupler of an EMP 80 having a scissor lift mechanism 82 may be substantially similar to the coupling of the electro-mechanical device 24 to the universal coupler 50 as described herein with reference to an EMP 10 having a retractable mast 16.

According to an exemplary embodiment, the EMP 10 includes a lift device controller 30 configured to control operation of the EMP 10 (FIG. 3). In particular, the lift device controller 30 is configured to control operation of the steering system 32, the mast 16 (e.g., lift mechanism, lift system, etc.), a stability and/or load system of the EMP 10, and/or the electro-mechanical device 24. As shown in FIG. 3, the lift device controller 30 is communicably coupled (e.g., electrically connected) to a remote control unit 90. The remote control unit 90 may be hardwired to the EMP 10 and/or wirelessly connected to the lift device controller 30 (e.g., via a communication interface of the lift device controller 30, etc.). The remote control unit 90 includes a user interface 92 (e.g., buttons, levers, a touch-screen display, etc.) structured to receive user commands. In other embodiments, the lift device controller 30 may include an automatic guidance and/or mobility system configured for autonomous mobility. For example, the lift device controller 30 may be communicatively coupled to one or more sensors 94 of the EMP 10 and be configured to control operation of the EMP 10 based on information received from the one or more sensors 94. The sensors 94 may include optical sensors (e.g., vision-based sensors), proximity sensors, or another sensor type. As such, the lift device controller 30 may be configured to control operation (e.g., movement) of the EMP 10 based on the environment surrounding the EMP 10. For example, the lift device controller 30 may be configured to power the electric drive and steering system 32 to maneuver the EMP 10 around obstacles, between shelves or other storage areas in a warehouse, etc. based on input from the sensors 94. Likewise, the lift device controller 30 may be configured to halt operation of the EMP 10 based on input from the sensors 94 that indicates a safety hazard for an operator or any proximate bystanders.

In some embodiments, at least some of the sensors 94 may be disposed on the electro-mechanical device 24 and configured to facilitate operations performed by the electro-mechanical device 24 and/or mast 16 (e.g., aligning an effector with a material to be operated on, placement of materials by the effector, raising and lowering of the mast 16 to position the electro-mechanical device 24 at different heights, etc.). In yet other embodiments, the lift device controller 30 may be configured to operate the steering system 32, the mast 16 (e.g., lift mechanism, lift system, etc.), a stability and/or load system of the EMP 10, and/or the electro-mechanical device 24 by having the EMP 10 shadow user movements. For example, the lift device controller 30 may be configured to control the electric drive and/or steering system 32 to follow a user to different locations. In another example, the lift device controller 30 may be configured to manipulate the electro-mechanical device 24 (e.g., robotic arm) based on gestures made by the operator (e.g., arm movement, hand movement, etc.). In this way, the lift device controller 30 can facilitate operations that traditionally require careful manipulation of delicate materials by manual laborers. In other embodiments, the lift device controller 30 may employ another type of automatic guidance technique to facilitate EMP 10 operations.

According to an exemplary embodiment, the EMP 10 also includes a stability and/or load control system, shown as stability system 96 (FIG. 2) that is implemented by the lift device controller 30 (e.g., a processing circuit of the lift device controller). The stability system 96 may control operation of the EMP 10 based on measured load and other EMP 10 operations data. As shown in FIG. 2, the stability system 96 includes a plurality of load sensors 97 configured to monitor loads supported by the electro-mechanical device 24 (e.g., a position of the mast 16, an effector of the electro-mechanical device 24, etc.). For example, the load sensors 97 may include strain gages positioned on the mast 16 (e.g., a sidewall of one or more support members 26, opposing sidewalls of a support member 26, etc.). The load may be determined based on information received from the strain gages and the design or characteristics of the mast 16 (e.g., the materials used for the mast 16 and the geometry of the mast 16). For example, measured values of strain may be entered into empirically-derived algorithms for the load that are determined during testing of the EMP 10 with different loads.

The stability system 96 may also include position sensors and/or speed sensors configured to monitor a position of the load. For example, the stability system 96 may include linear encoders to determine a lateral position of the load relative to a central axis of the mast 16 or the base 12, or a vertical position of the universal coupler 50 relative to an upper surface of the base 12. The stability system 96 may also include a tachometer to monitor the rotational speed and/or acceleration of the driveshaft and/or wheels 14A, 14B, or rotary encoders to monitor a rotational position of the wheels 14B. According to an exemplary embodiment, the stability system 96 (e.g., the lift device controller 30) is configured to use one, or a combination of (i) the measured stress/strain on the mast 16, (ii) the load, (iii) the position of the load to determine the allowable range of operating parameters for the EMP 10. For example, the stability system 96 may be configured to limit a height (e.g., a maximum extension) of the mast 16 and/or a lateral position of the electro-mechanical device 24 based on the above factors to prevent the EMP 10 from tipping over or to prevent damage to the mast 16. In other embodiments, the above factors may be used to limit a maximum amount of acceleration or rate of turning that can be performed by the EMP 10 in response to user commands. In some embodiments, the lift device controller 30 is configured to estimate load and stability metrics from the load sensors, position sensors, and/or speed sensors in real time to ensure that the EMP 10 is safely operated.

The stability system 96 may be configured to alter the operating parameters for the EMP 10 according to nature or characteristics of the electro-mechanical device 24 that may be coupled to the EMP 10 at a particular time. For example, in one application, the effector of the electro-mechanical device 24 may be a grasping device adapted to grasp a heavy load from a warehouse shelf. In such applications, significant forces may be exerted upon the electro-mechanical device 24 and mast 16 during operation of the EMP 10. Contrariwise, other applications may require the effector of the electro-mechanical device to be a welding attachment. In these applications, normal operation of the EMP 10 may not result in the exertion of significant forces on the electro-mechanical device 24 or the EMP 10. In light of the likely variances in operating conditions that may occur with different electro-mechanical devices 24, the stability system 96 may be adapted to determine and/or alter the operating parameters of the EMP 10 when an electro-mechanical device 24 is coupled to the EMP 10 or when one electro-mechanical device 24 is exchanged for another. The stability system 96 made determine which operating parameters are appropriate upon receiving an effector-type signal from the electro-mechanical device. The effector-type signal may be a signal sent from the electro-mechanical device 24 via an electrical connection established with the electro-mechanical device 24 is coupled to the universal coupler 50, or by a wireless signal (e.g., RFID signal) transmitted when one electro-mechanical device 24 is within a certain proximity of the EMP 10.

In some embodiments, the range of operating parameters can be presented to the user via the user interface, along with recommendations for adding counterweights 100 (e.g., the amount of counterweight needed, counterweight size, position, etc.) to increase the overall range of operating parameters. As shown in FIG. 3, the counterweights 100 are positioned on an upper surface of the base 12 beneath the electro-mechanical device 24. In other embodiments, the counterweights 100 may be positioned in another location (e.g., on the mast 16, a rear end of the base 12 adjacent to the mast 16, etc.).

In other embodiments, the remote control unit 90 and/or lift device controller 30 may be preprogrammed with an operable envelope and mass capacity within which to operate (e.g., a maximum range of movement, lateral displacement, vertical position, etc. that can be achieved for a given load, a load entered by the use into the user interface of the remote control unit 90, etc.).

Figure 7:
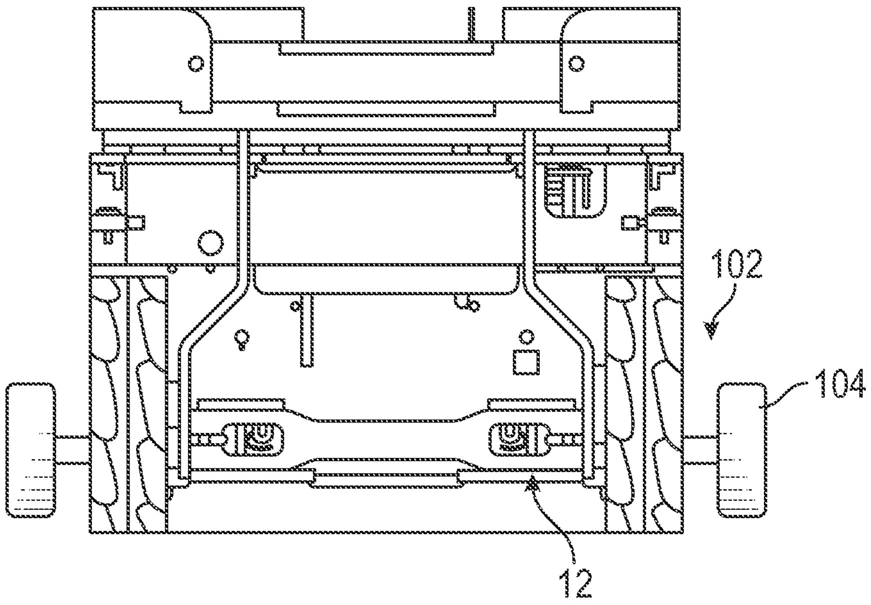
FIG. 7 is a front view of a lift device including an outrigger assembly, according to an exemplary embodiment.
Figure 8:
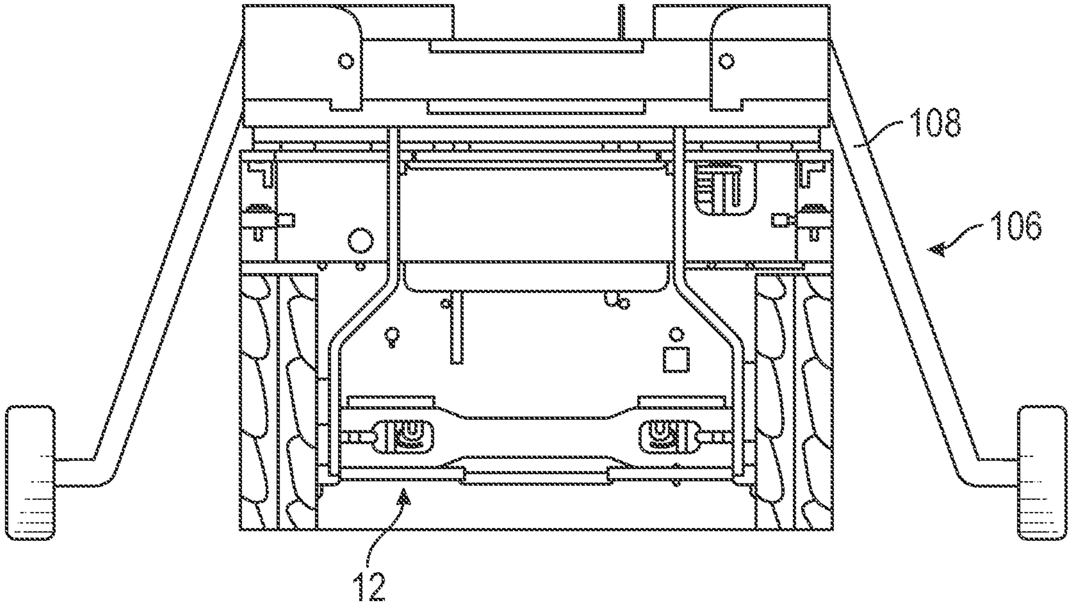
FIG. 8 is a front view of a lift device including an outrigger assembly, according to another exemplary embodiment.
Figure 9:
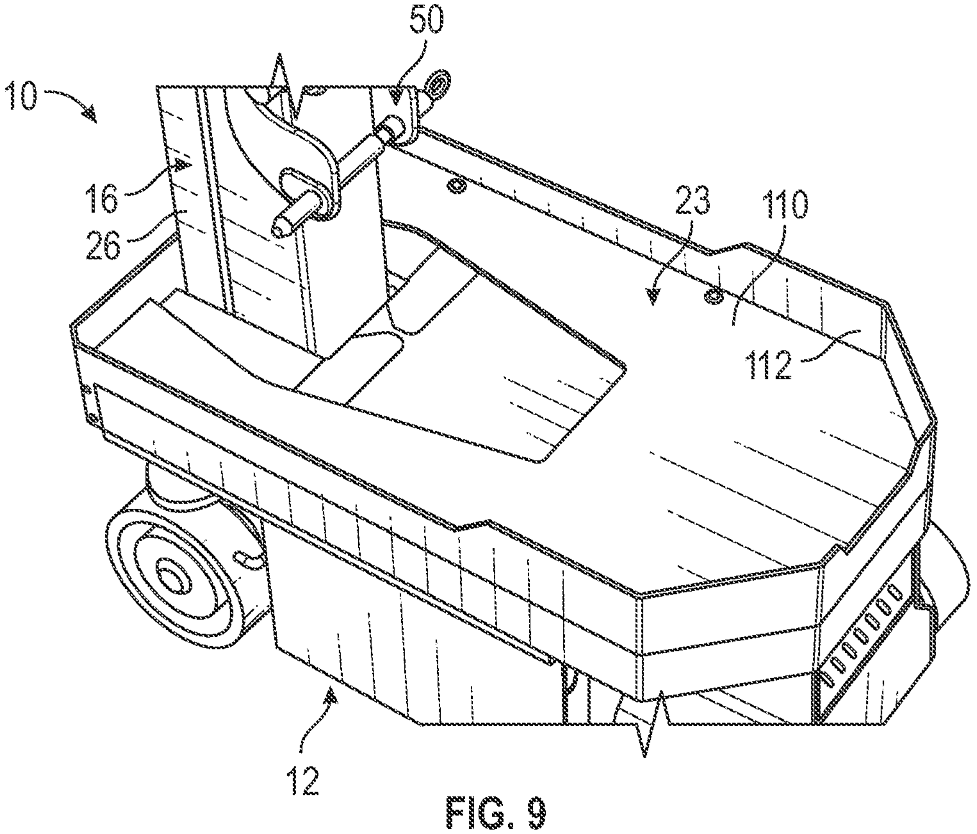
FIG. 9 is a perspective view of a storage tray portion of the lift device of FIG. 1, according to an exemplary embodiment.

According to an exemplary embodiment shown in FIGS. 7-8, the EMP 10 additionally includes outriggers to enhance the overall stability and rigidity of the EMP 10 during operation. The outriggers may be permanently deployed or manually positioned by an operator based on the anticipated loading conditions. In other embodiments, the outriggers may be automatically deployed (e.g., positioned to contact the ground a distance from the base 12, etc.) based on load conditions entered by the operator into a user interface of the EMP 10 or based on information received from the stability system 96. Load sensors in the lift/elevating mechanism can be employed to determine outrigger position. In other embodiments, the EMP 10 may include linear encoders to determine the relative position where the outriggers contact the ground relative to the base 12. In some embodiments, a height of the outriggers relative to the base 12 and/or height of the wheels 14A, 14B relative to the base 12 may also be adjusted by the stability system 96 to level an upper surface of the base 12 (e.g., for automatic load leveling). As shown in FIG. 7, the outriggers 102 include wheels 104 or pads that are spaced apart from the base 12 in a lateral direction (e.g., normal to the central axis extending vertically through the base 12, side-to-side, etc.). In FIG. 9, the outriggers 106 include height adjustable support legs 108 that are pivotably coupled to the base 12. In other embodiments, the outriggers may be arranged in a fixed position relative to the base 12.

The EMP 10 may include various attachments and/or storage compartments to facilitate carrying tools for the operators and/or interchangeable end effectors for the electro-mechanical device 24 (see also FIG. 3). As shown in FIG. 9, the EMP 10 includes a storage tray 23 that is coupled to the base 12 and extends across an upper surface of the base 12 in an area below where the electro-mechanical device 24 (see also FIG. 3) is positioned. The storage tray 23 includes a cover 110 that extends across the upper surface and surrounds a portion of the mast 16 (e.g., fully surrounds the mast 16 adjacent to the first end 18 of the mast 16). The storage tray 23 also includes a plurality of sidewalls 112 extending upwardly from an outer perimeter of the cover 110 in perpendicular orientation relative to the cover 110. The sidewalls 112 prevent tools, effectors, and/or other components stored within the storage tray 23 from falling off of the base 12 during movement. In some embodiments, a height of at least one of the sidewalls 112 is sized to fully occupy a space between the base 12 and the electro-mechanical device 24 when the mast 16 is in a fully retracted position.

It will be appreciated that the design of the storage tray 23 may differ in various exemplary embodiments. For example, in some embodiments, the storage tray 23 may include partitions (e.g., walls, dividers, etc.) that separate the storage tray 23 into multiple compartments. In some embodiments, the storage tray 23 may include cup holders, drawers, shelves, covers, locking covers, and/or interchangeable end effector tools. In other embodiments, the storage tray 23 may be a standalone toolbox (e.g., an external toolbox) that may be detachably from the base 12. Among other benefits, the storage tray 23 provides a self-propelled tool chest that simplifies operator interaction, repair, and/or maintenance of the EMP 10 on the fly. The storage tray 23 may also improve the overall aesthetic of the EMP 10, by concealing various electronics and working components of the EMP 10.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A lift device, comprising:

a base having an electric drive and at least two rotatable wheels powered by the electric drive;

a retractable lift assembly having a first end coupled to the base and a second end that is movable relative to the base;

a coupler mounted to a first surface of the retractable lift assembly, wherein the coupler further comprises at least one mounting stud, the at least one mounting stud extending outwardly away from the retractable lift assembly;

an electro-mechanical device detachably coupled to the at least one mounting stud, the electro-mechanical device repositionable relative to the retractable lift assembly; and a battery pack electrically connected to the electric drive and the retractable lift assembly, wherein the battery pack is electrically connected to the electro-mechanical device.

2. The lift device of claim 1, wherein the at least one mounting stud is coupled to and extending away from a first side of the retractable lift assembly.

3. The lift device of claim 2, wherein the at least one mounting stud is a first mounting stud, further comprising a second mounting stud coupled to and extending away from a second side of the retractable lift assembly opposite the first side.

4. The lift device of claim 3, wherein the first and second mounting studs are diametrically opposed, such that the first and second mounting studs form a pair of diametrically opposed mounting stud ends.

5. The lift device of claim 4, wherein the coupler further comprises:

a first flange having a first surface and a first aperture; and a second flange having a second surface and a second aperture, wherein the first mounting stud extends from the first flange in a first direction from the first surface, and the second mounting stud extends from the second flange in a second direction from the second surface.

6. The lift device of claim 3, wherein the first mounting stud extends away from the second mounting stud and the second mounting stud extends away from the first mounting stud.

7. The lift device of claim 1, wherein the retractable lift assembly is a retractable mast, and wherein the first end of the retractable mast is disposed adjacent to a side of the base.

8. The lift device of claim 7, wherein the first end of the retractable mast retracts within the second end.

9. A material handling system, comprising:

a lift device having at least two rotatable wheels, a base, and a retractable lift assembly, wherein the retractable lift assembly has a first lift end coupled to the base and a second lift end that is movable relative to the base; and a coupler assembly mounted to the retractable lift assembly, the coupler assembly comprising:

a first flange having a first surface and a first aperture;

a second flange having a second surface and a second aperture;

a pair of diametrically opposed mounting stud ends, a first stud end of the pair of mounting stud ends extending from the first flange in a first direction perpendicular to the first surface, a second stud end of the pair of mounting stud ends extending from the second flange in a second direction perpendicular to the second surface, and an electro-mechanical device detachably coupled to the coupler.

10. The material handling system of claim 9, said electro-mechanical device having one or more hooks and one or more mounting apertures, wherein the one or more hooks are configured to couple to at least one of the pair of mounting stud ends.

11. The material handling system of claim 10, further comprising a pin, wherein the pin is inserted through the mounting aperture and at least one of the first aperture or second aperture.

12. The material handling system of claim 11, wherein the electro-mechanical device includes two hooks, wherein a first hook of the two hooks is adapted to couple to the first stud end and a second hook of the two hooks is adapted to couple to the second stud end.

13. The material handling system of claim 10, wherein the lift device further comprises:

an electric drive, wherein the at least two rotatable wheels are powered by the electric drive; and a battery pack electrically connected to the electric drive and the retractable lift assembly, wherein the electro-mechanical device is mechanically coupled to the mounting studs and electrically connected to the base.

14. The material handling system of claim 10, wherein the lift device further comprises a stability system, the stability system configured to selectively limit operation of the lift device according to at least one operating parameter.

15. The material handling system of claim 14, wherein the at least one operating parameter is determined by an effector-type signal of the electro-mechanical device.

16. The material handling system of claim 10, further comprising an automatic guidance system configured to control operation of the at least two rotatable wheels based on a position of a bystander.

17. A lift device, comprising:

a base having an electric drive and at least two rotatable wheels powered by the electric drive;

a retractable lift assembly having a first end coupled to the base and a second end that is movable relative to the base, wherein the first end of the retractable lift assembly retracts within the second end;

a coupler mounted to a first surface of the retractable lift assembly, wherein the coupler further comprises at least one mounting stud;

an electro-mechanical device detachably coupled to the at least one mounting stud, the electro-mechanical device repositionable relative to the retractable lift assembly; and a battery pack electrically connected to the electric drive and the retractable lift assembly.

18. The lift device of claim 17, wherein the at least one mounting stud is coupled to and extending away from a first side of the retractable lift assembly.

19. The lift device of claim 17, wherein the at least one mounting stud is a first mounting stud, further comprising a second mounting stud coupled to and extending away from a second side of the retractable lift assembly opposite the first side.

* * * * *